United States Patent
Kazusa (10) Patent No.: US 10,955,047 B2
(45) Date of Patent: Mar. 23, 2021

(54) VEHICLE CONTROL APPARATUS

(71) Applicant: Honda Motor Co., Ltd., Tokyo (JP)

(72) Inventor: Yoshihiro Kazusa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/579,346

(22) Filed: Sep. 23, 2019

(65) Prior Publication Data

US 2020/0109780 A1  Apr. 9, 2020

(30) Foreign Application Priority Data

Oct. 5, 2018  (JP) .............................. JP2018-190067

(51) Int. Cl.
*B60W 10/06* (2006.01)
*B60W 10/10* (2012.01)
*F16H 61/02* (2006.01)

(52) U.S. Cl.
CPC ......... *F16H 61/0246* (2013.01); *B60W 10/10* (2013.01); *B60W 2510/1005* (2013.01)

(58) Field of Classification Search
CPC ...... B60W 10/06; B60W 10/10; B60W 10/11; B60W 30/19; B60W 30/20; B60W 2030/206; B60W 2510/0676; B60W 2510/1005; B60W 5710/0644; B60W 2710/1005; B60W 2720/24; F16H 61/0246; F16H 2059/467; F16H 2061/0481; F16H 2061/0485; F16H 2061/0488; F16H 63/50; F16H 63/502; F16H 2063/504; F16H 2063/506; F16H 2063/508; F16H 2312/09
See application file for complete search history.

(56) References Cited

U.S. PATENT DOCUMENTS

| | | | | |
|---|---|---|---|---|
| 4,245,604 A | * | 1/1981 | Lahiff | B60W 10/06 123/478 |
| 4,769,774 A | * | 9/1988 | Narita | B60W 10/04 123/480 |
| 5,588,515 A | * | 12/1996 | Toyama | B60W 10/06 192/109 F |

FOREIGN PATENT DOCUMENTS

| | | |
|---|---|---|
| JP | H0749048 A | 2/1995 |
| JP | H08105332 A | 4/1996 |
| JP | H08105334 A | 4/1996 |
| JP | 2002264684 A | 9/2002 |
| JP | 2006200516 A | 8/2006 |
| JP | 2008051046 A | 3/2008 |

* cited by examiner

*Primary Examiner* — Edwin A Young
(74) *Attorney, Agent, or Firm* — Duft & Bornsen, PC (57) ABSTRACT

A vehicle control apparatus including a torque transmission detecting part detecting a torque transmission state switched by a torque transmission switching part and a microprocessor configured to perform setting a target speed of an internal combustion engine in accordance with the torque transmission state detected by the torque transmission detecting part. The microprocessor is configured to perform the setting including increasing the target speed when a switch to the off-gear state is detected by the torque transmission detecting part after a switch instruction to an off-gear state the first is output by a first switch instruction part, while not increasing the target speed even when the switch to the off-gear state is detected by the torque transmission detecting part after a switch instruction to a reverse in-gear state or forward in-gear state is output by the second switch instruction part.

12 Claims, 6 Drawing Sheets

VEHICLE CONTROL APPARATUS

CROSS-REFERENCE TO RELATED APPLICATION

This application is based upon and claims the benefit of priority from Japanese Patent Application No. 2018-190067 filed on Oct. 5, 2018, the content of which is incorporated herein by reference.

BACKGROUND OF THE INVENTION

Field of the Invention

This invention relates to a vehicle control apparatus.

Description of the Related Art

Conventionally, there have been known apparatuses that when the engine temperature is less than a predetermined temperature, increase the amount of intake air supplied to the engine to increase the engine speed during idling and thus prevent an engine stall. Such an apparatus is described in, for example, Japanese Unexamined Patent Publication No. H07-49048 (JPH07-049048A).

When switching between forward and reverse by changing a gear engagement from the forward gear to the reverse gear or from the reverse gear to the forward gear, a shock may be caused by torsion of the drive shaft, or unusual noise may be caused by backlash of the gear. To reduce such a shock or unusual noise when switching between forward and reverse, it is preferred to temporarily put the transmission into an off-gear state in which the gear is disengaged. However, for example, if the engine speed is increased as is done in the apparatus described in JPH07-049048A while the transmission is temporarily put in an off-gear state in the middle of switching between forward and reverse with the engine temperature being low, the driver may feel strange.

SUMMARY OF THE INVENTION

An aspect of the present invention is an apparatus configured to control a vehicle including an internal combustion engine and a transmission having a forward gear and a reverse gear. The apparatus includes: a torque transmission switching part configured to switch a torque transmission state to one of a forward in-gear state in which a torque output from the internal combustion engine is transmitted to an output shaft of the transmission through the forward gear, a reverse in-gear state in which the torque output from the internal combustion engine is transmitted to the output shaft of the transmission through the reverse gear, and an off-gear state in which a transmission of the torque output from the internal combustion engine to the output shaft of the transmission is blocked; a first switch instruction part configured to output a first switch instruction to switch from the forward in-gear state or the reverse in-gear state to the off-gear state; a second switch instruction part configured to output a second switch instruction to switch from the forward in-gear state to the reverse in-gear state or from the reverse in-gear state to the forward in-gear state; a torque transmission detecting part configured to detect the torque transmission state switched by the torque transmission switching part; a rotational speed changing part configured to change a rotational speed of the internal combustion engine; and an electronic control unit having a microprocessor and a memory connected to the microprocessor. The microprocessor is configured to perform: controlling the torque transmission switching part so as to switch from the forward in-gear state or the reverse in-gear state to the off-gear state when the first switch instruction is output from the first switch instruction part, and so as to switch from the forward in-gear state or the reverse in-gear state to the off-gear state until a predetermined time has elapsed when the second switch instruction is output from the second switch instruction part and to switch from the off-gear state to the reverse in-gear state or the forward in-gear state after the predetermined time has elapsed; setting a target speed of the internal combustion engine in accordance with the torque transmission state detected by the torque transmission detecting part; and controlling the rotational speed changing part so that the rotational speed of the internal combustion engine becomes the target speed set in the setting. The microprocessor is configured to perform the setting including increasing the target speed when the off-gear state is detected by the torque transmission detecting part after the first switch instruction is output by the first switch instruction part, while not increasing the target speed even when the off-gear state is detected by the torque transmission detecting part after the second switch instruction is output by the second switch instruction part.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
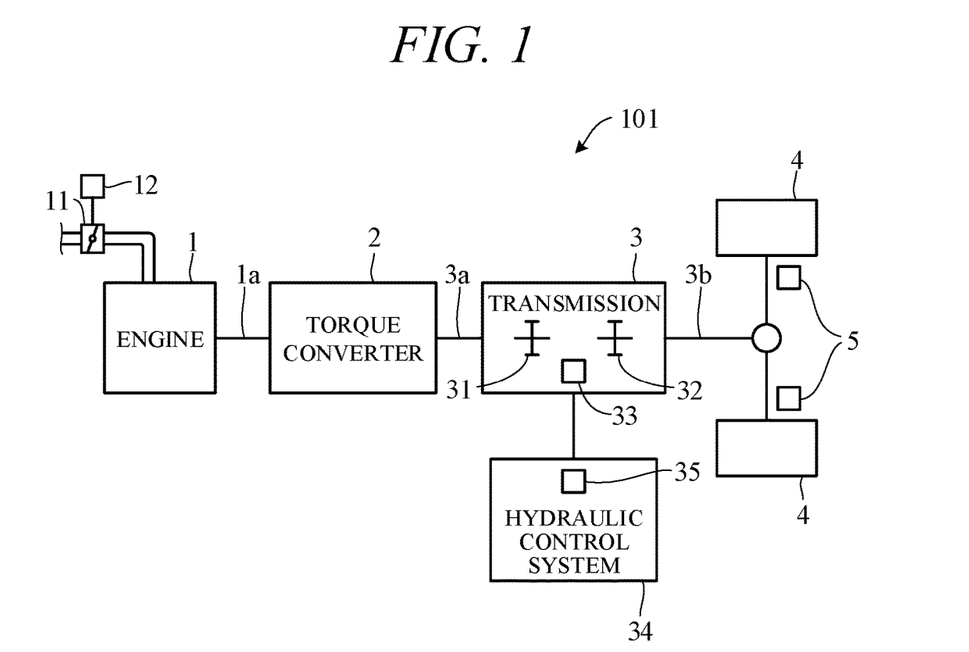
FIG. 1 is a diagram showing a schematic configuration of a travel driving system of a vehicle to which a vehicle control apparatus according to an embodiment of the present invention is applied.

Hereinafter, an embodiment of the present invention will be described with reference to FIGS. 1 to 7. FIG. 1 is a diagram showing a schematic configuration of a travel driving system of a vehicle 101 to which a vehicle control apparatus according to an embodiment of the present invention is applied. As shown in FIG. 1, the vehicle 101 includes an engine 1, a torque converter 2, and a transmission 3.

The engine 1 is an internal-combustion engine (e.g., gasoline engine), which generates rotational power by mixing intake air supplied through an intake valve (throttle valve, etc.) 11 and fuel injected from an injector at a proper ratio and igniting the mixture using a spark plug or the like to burn the mixture. Instead of the gasoline engine, any other type of engine, such as a diesel engine may be used. The amount of intake air is controlled by an intake valve 11, and the opening degree of the intake valve 11 is changed by driving an intake actuator 12 that is driven by an electrical signal.

The torque converter 2 is a fluid transmitter, which transmits the torque through fluid (hydraulic oil), and includes a pump impeller coupled to an output shaft 1a of the engine 1, a turbine runner coupled to an input shaft 3a of the transmission 3, and a lockup clutch. While the lockup clutch is disengaged (lockup is off), the torque is transmitted between the engine 1 and transmission 3 through fluid. For example, while the vehicle stops or starts to travel, lockup is off. While the lockup clutch is engaged (lockup is on), the pump impeller and turbine runner are mechanically directly coupled together, and the torque is transmitted between the engine 1 and transmission 3 not through fluid. For example, while the vehicle travels at predetermined speed or more, lockup is on.

The transmission 3 is, for example, a stepped transmission, which is able to change the gear ratio in steps, and includes multiple (only one shown) forward gears 31 corresponding to multiple gear ratios and a reverse gear 32. The transmission 3 may be a continuously variable transmission, which is able to continuously change the gear ratio. The transmission 3 is disposed on a power transmission path between the torque converter 2 and driving wheels 4. The transmission 3 changes the speed of rotation received from the torque converter 2 through the input shaft 3a, as well as changes the torque received from the torque converter 2 and outputs the changed torque from an output shaft 3b. The rotation outputted from the output shaft 3b is transmitted to the driving wheels 4, causing the vehicle 101 to travel. The vehicle 101 may be formed as a hybrid vehicle by disposing a travel motor as a driving source in addition to the engine 1. The vehicle 101 is braked by brake devices 5 disposed on the driving wheels 4.

The transmission 3 includes multiple (only one shown) engagement elements 33, such as a dog clutch, a friction clutch, and a brake. The hydraulic control system 34 engages or disengages the engagement elements 33 by controlling the flow of oil supplied to the engagement elements 33 and thus is able to change the shift stage of the transmission 3. For example, the hydraulic control system 34 establishes any forward shift stage or a reverse shift stage of multiple shift stages by engaging (turning on) a predetermined engagement element 33 (in-gear state). Thus, the torque can be transmitted to the output shaft 3b through the forward gear 31 or reverse gear 32. On the other hand, the hydraulic control system 34 blocks the torque transmission path from the input shaft 3a to the output shaft 3b by disengaging (turning off) all the engagement elements 33, disabling transmission of the torque from the output shaft 3b (off-gear state).

The hydraulic control system 34 includes a transmission valve mechanism (referred to as the "transmission actuator 35" for convenience), such as a solenoid valve, that is driven by an electrical signal. The hydraulic control system 34 can put the transmission 3 into the in-gear state or off-gear state by driving the transmission actuator 35 and thus changing the flow of pressure oil to the engagement elements 33. The transmission 3 is formed as shift-by-wire type, which changes the shift range in accordance with a signal of a shift switch.

Figure 2:
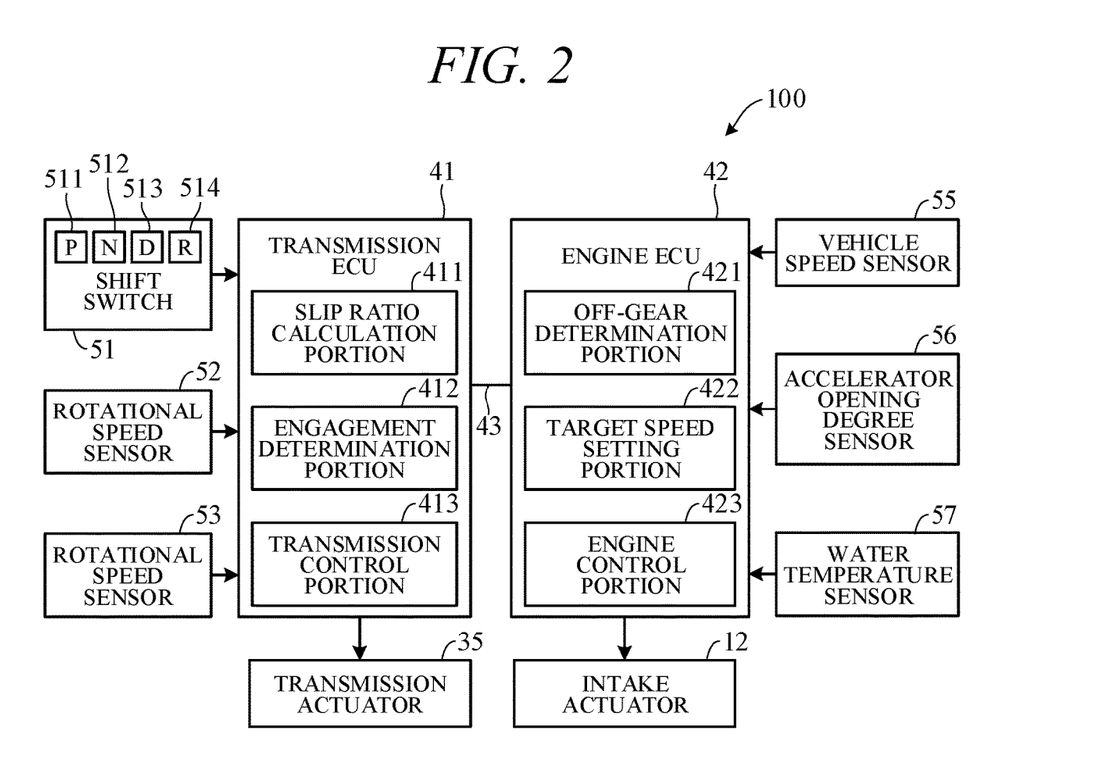
FIG. 2 is a block diagram schematically showing an overall configuration of a vehicle control apparatus according to the embodiment of the present invention.

FIG. 2 is a block diagram schematically showing the overall configuration of a vehicle control apparatus 100 according to the embodiment of the present invention. The vehicle 101 includes multiple electronic control units (ECUs) that control the components of the vehicle 101. As shown in FIG. 2, in particular, the vehicle control apparatus 100 includes a transmission ECU 41 that mainly controls the operation of the transmission 3 and an engine ECU 42 that mainly controls the operation of the engine 1. The transmission ECU 41 and engine ECU 42 are mutually communicatively connected through a CAN communication line 43.

The transmission ECU 41 receives signals from a shift switch 51 and rotational speed sensors 52 and 53. The rotational speed sensor 52 directly or indirectly detects the rotational speed Ne of the output shaft 1a of the engine 1 (engine rotational speed), that is, an input rotational speed of the torque converter 2. The rotational speed sensor 53 directly or indirectly detects the rotational speed Ni of the input shaft 3a of the transmission 3 (input shaft rotational speed), that is, an output rotational speed of the torque converter 2.

The shift switch 51 receives a shift change command based on a driver's operation, that is, a shift range change command. The shift switch 51 includes a P switch 511 that issues a command requesting a P range, an N switch 512 that issues a command requesting an N range, a D switch 513 that issues a command requesting a D range, and an R switch 514 that outputs a command requesting an R range. The switches 511 to 514 are formed as, for example, pressing switches, and mutually independent operation buttons corresponding to the switches 511 to 514 are disposed near the driver's seat.

The P range is a parking range, the N range is a neutral range, the D range is a forward-travel range, and the R range is a reverse-travel range. The P range and N range are non-travel ranges in which transmission of the torque to the forward gear 31 and reverse gear 32 is blocked. When a command requesting the P range or N range is output, the transmission 3 is put into an off-gear state. The D range and R range are travel ranges in which the torque can be transmitted to the forward gear 31 or reverse gear 32. When a command requesting the D range or R range is output, the transmission 3 is put into an in-gear state.

The transmission ECU 41 includes a computer including a processing unit (microprocessor), such as a CPU, a memory, such as a ROM or RAM, and other peripheral circuits. The transmission ECU 41 includes, as functional configurations, a slip ratio calculation portion 411, an engagement determination portion 412, and a transmission control portion 413.

The slip ratio calculation portion 411 calculates a slip ratio $\alpha$ as a parameter indicating the slip state of the torque converter 2 on the basis of signals from the rotational speed sensors 52 and 53. The slip ratio $\alpha$ is the ratio of input rotation to output rotation of the torque converter 2 and is a value obtained by dividing the input shaft rotational speed Ni detected by the rotational speed sensor 53 by the engine rotational speed Ne detected by the rotational speed sensor 52 (Ni/Ne). For example, when the transmission 3 is put into the in-gear state during a stop of the vehicle, rotation of the input shaft 3a is blocked by activation of the brakes 5; when the transmission 3 is put into the off-gear state during a stop of the vehicle, drag (lost motion) of the input shaft 3a is caused by rotation of the output shaft 1a of the engine 1.

For this reason, when the vehicle speed is less than a predetermined value and lockup is off, the slip ratio $\alpha$ is small in the in-gear state and is increased in the off-gear state. For example, when the transmission 3 is in the in-gear state, the slip ratio $\alpha$ is 0 (Ni=0); when the transmission 3 is put into the off-gear state, Ni is increased, and the slip ratio α approaches 1.0 (for example, the slip ratio α becomes 1.0). That is, the in-gear state and the off-gear state (on and off of the engagement elements 33), which are gear states of the transmission 3, and the slip ratio α of the torque converter 2 have a correlation, and the slip ratio α is increased as the transmission 3 makes a transition from the in-gear state to the off-gear state (as the engagement elements 33 are switched from on to off). When the vehicle speed is equal to or greater than the predetermined value and lockup is on (the lockup clutch is completely engaged), Ne is equal to Ni and the slip ratio α is 1.

Figure 3:
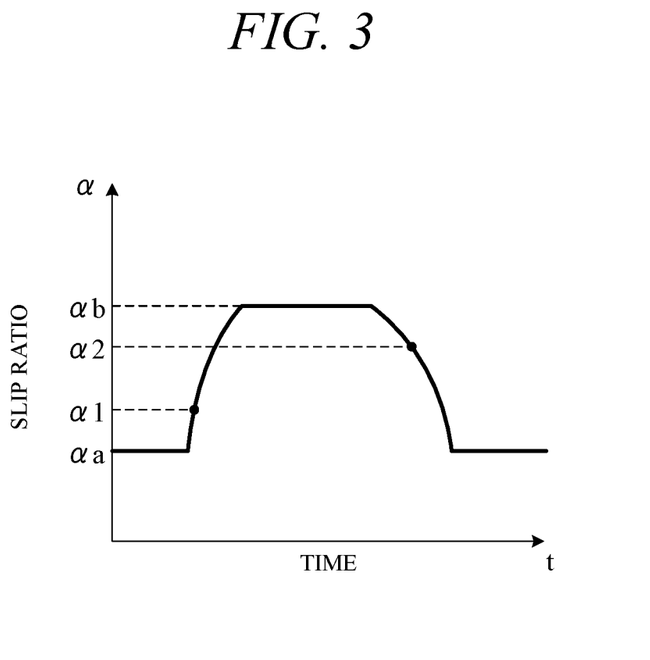
FIG. 3 is a diagram showing an example of a temporal change in a slip ratio of a torque converter.

The engagement determination portion 412 determines whether the transmission 3 has made a transition from the off-gear state to the in-gear state (engagement has been turned on) or has made a transition from the in-gear state to the off-gear state (engagement has been turned off), on the basis of the slip ratio α calculated by the slip ratio calculation portion 411. FIG. 3 is a diagram showing an example of temporal changes in the slip ratio α over time during a transition from the in-gear state to the off-gear state and during a transition from the off-gear state. As shown in FIG. 3, for example, assuming that the slip ratio in the in-gear state is αa and the slip ratio in the off-gear state is αb, a first predetermined value α1 and a second predetermined value α2 are set between αa and αb. For example, αa, αb, α1, and α2 have a relationship of αa>α2>α1>αb.

When the slip ratio becomes equal to or greater than the first predetermined value α1 in the in-gear state in which the slip ratio is αa, the engagement determination portion 412 determines that the transmission 3 has made a transition from the in-gear state to the off-gear state (engagement-off determination). On the other hand, when the slip ratio becomes equal to or smaller than the second predetermined value α2 in the off-gear state in which the slip ratio is αb, the engagement determination portion 412 determines that the transmission 3 has made a transition from the off-gear state to the in-gear state (engagement-on determination).

If the engagement determination portion 412 makes an engagement-on determination, it outputs the engagement-on signal. Also, if the shift switch 51 outputs a command requesting the P range or N range and the engagement determination portion 412 makes an engagement-off determination, the engagement determination portion 412 outputs an engagement-off signal. On the other hand, even if the shift switch 51 issues a command requesting the D range or R range and the engagement determination portion 412 makes an engagement-off determination, the engagement determination portion 412 does not output the engagement-off signal but rather continues to output the engagement-on signal.

The transmission control portion 413 controls the transmission 3 by outputting control signals to the transmission actuator 35 in response to operation of the shift switch 51. Specifically, when the P switch 511 or N switch 512 is operated, the transmission control portion 413 puts the transmission 3 into the off-gear state by disengaging the engagement elements 33 of the transmission 3; when the R switch 514 is operated, the transmission control portion 413 puts the transmission 3 into the in-gear state (reverse in-gear state) by engaging a predetermined engagement element 33 of the transmission 3 and thus establishing a reverse shift stage, allowing the torque outputted from the engine 1 to be transmitted to the output shaft 3b through the reverse gear 32; and when the D switch 513 is operated, the transmission control portion 413 puts the transmission 3 into the in-gear state (forward in-gear state) by engaging a predetermined engagement element 33 of the transmission 3 and thus establishing a forward shift stage, allowing the torque outputted from the engine 1 to be transmitted to the output shaft 3b through the forward gear 31. In a forward in-gear state, a target shift stage corresponding to the vehicle speed and accelerator opening degree is set in accordance with a predetermined shift map, and the transmission control portion 413 outputs control signals to the transmission actuator 35 so that the shift stage becomes the target shift stage.

When the R switch 514 is operated in a forward in-gear state, the transmission control portion 413 puts the transmission 3 into the off-gear state for a predetermined time (e.g., one second) and then outputs control signals to the transmission actuator 35 so that the transmission 3 is put into a reverse in-gear state. Similarly, when the D switch 513 is operated in the reverse in-gear state, the transmission control portion 413 puts the transmission 3 into the off-gear state for a predetermined time (e.g., one second) and then outputs control signals to the transmission actuator 35 so that the transmission 3 is put into the forward in-gear state.

That is, when the D switch 513 is operated and then the R switch 514 is operated without operating any of the P switch 511 and N switch 512 or when the R switch 514 is operated and then the D switch 513 is operated without operating any of the P switch 511 and N switch 512, the transmission control portion 413 temporarily puts the transmission 3 into the off-gear state. As seen above, when a command requesting a switch from the D range to the R range or a switch from the R range to the D range is output, the transmission 3 is temporarily is put into the off-gear state. This allows for a reduction in a shock caused by torsion of the drive shaft, as well as for suppression of unusual noise caused by backlash of the gear in the transmission 3.

The engine ECU 42 receives signals from a vehicle speed sensor 55, an accelerator opening degree sensor 56, and a water temperature sensor 57. The accelerator opening degree sensor 56 detects the manipulated variable of the accelerator pedal, that is, the accelerator opening degree. The water temperature sensor 57 detects the engine cooling water temperature Tw. Any other type of sensor that detects a physical quantity having a correlation with the engine cooling water temperature may be used in place of the water temperature sensor 57. Also, signals from the vehicle speed sensor 55 and accelerator opening degree sensor 56 may be inputted to the transmission ECU 41.

The engine ECU 42 includes a computer including a processing unit (microprocessor), such as a CPU, a memory, such as a ROM or RAM, and other peripheral circuits. The engine ECU 42 includes, as functional configurations, an off-gear determination portion 421, a target speed setting portion 422, and an engine control portion 423.

The off-gear determination portion 421 determines whether the transmission 3 is in the off-gear state, on the basis of a signal from the transmission ECU 41. That is, the off-gear determination portion 421 determines whether the engagement determination portion 412 has made an engagement-off determination. Even if the engagement determination portion 412 temporarily makes the engagement-off determination, for example, when a command requesting the switch from the D range to the R range has been output, it may continue to output an engagement-on signal. However, the off-gear determination portion 421 determines whether the transmission 3 is in the off-gear state, on the basis of not whether the engagement-on signal is being outputted from the engagement determination portion 412, but whether the engagement-off determination has been made.

The target speed setting portion 422 sets the target rotational speed of the engine 1 on the basis of signals including those from the water temperature sensor 57 and engagement determination portion 412. For example, the target speed setting portion 422 sets the target rotational speed (target idle rotational speed) when the vehicle speed is 0 and the acceleration pedal is nonoperational. When the engine cooling water temperature Tw detected by the water temperature sensor 57 is equal to or lower than a predetermined value Tw1 and the transmission 3 is in the off-gear state, the target speed setting portion 422 sets the target rotational speed to a greater value than that in the in-gear state by a predetermined rotational speed $\Delta Ne$. In the off-gear state, the load acting on the engine 1 is small. Accordingly, the amount of air in the cylinder of the engine 1 is small, the combustion pressure is low, and combustion stability is low. Therefore, an engine stall may occur due to a reduction in the engine rotational speed. For this reason, when the engine cooling water temperature Tw is low and the transmission 3 is in the off-gear state, the target speed setting portion 422 increases the target rotational speed in order to improve the combustibility of the engine 1 to prevent an engine stall. Hereafter, the yet-to-be-increased target rotational speed and the increased target rotational speed are referred to as the "first target rotational speed Ne1" and the "second target rotational speed Ne2," respectively. The second target rotational speed Ne2 is greater than the first target rotational speed Ne1 by a predetermined rotational speed $\Delta Ne$.

Even if the engagement determination portion 412 makes an engagement-off determination, for example, when a command requesting a switch from the D range to the R range is output, the target speed setting portion 422 does not increase the target rotational speed unless an engagement-off signal is outputted. In this case, the switch to the off-gear state is temporary (e.g., one second). Accordingly, the engine stall is less likely to occur, and there is no need to increase the target rotational speed. For this reason, the target speed setting portion 422 sets the first target rotational speed Ne1 as the target rotational speed.

The engine control portion 423 outputs control signals to the intake actuator 12 so that the engine rotational speed becomes the target rotational speed set by the target speed setting portion 422. Although not described herein, the engine control portion 423 also performs different control corresponding to the determination made by the off-gear determination portion 421.

Figure 4:
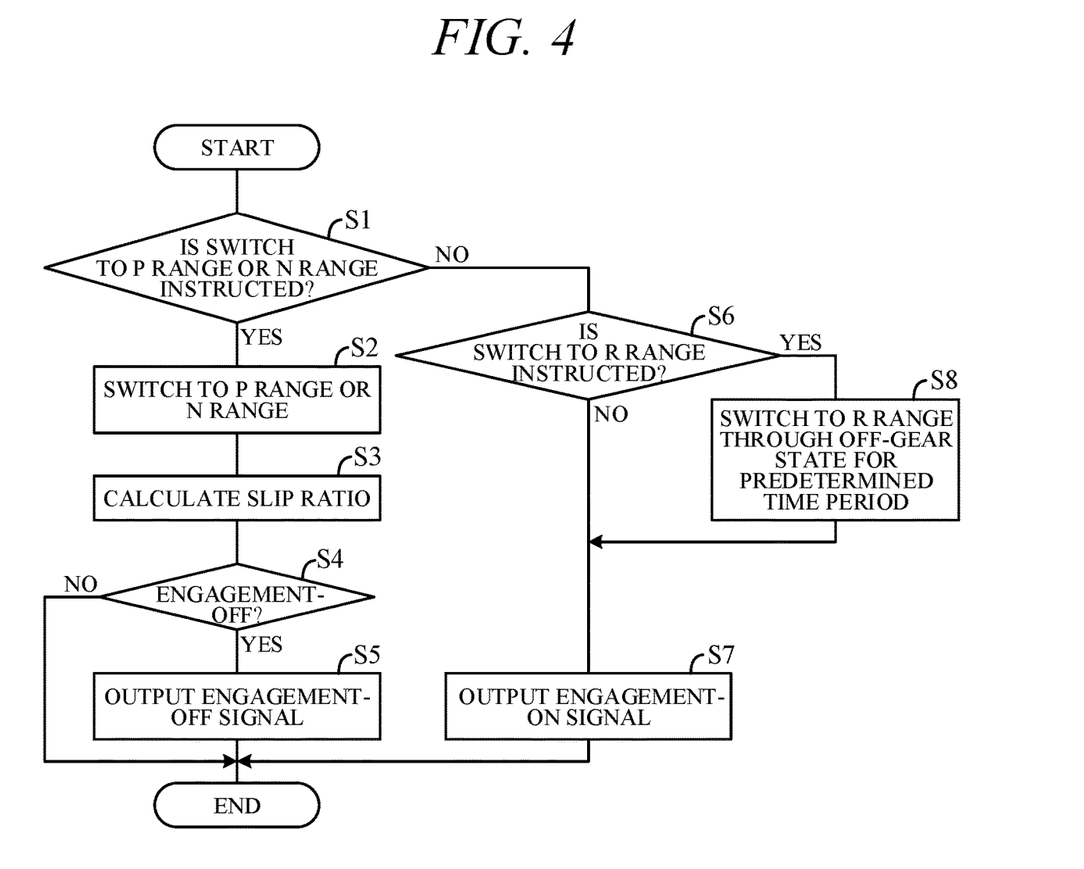
FIG. 4 is a flowchart showing an example of a process performed by of a transmission ECU in FIG. 2.

FIG. 4 is a flowchart showing an example of a process performed by the CPU of the transmission ECU 41 in FIG. 2 in accordance with a previously stored program. For example, the process shown by this flowchart is started in a state in which the transmission 3 has made a transition to a forward in-gear state by operating the D switch 513 and then repeated in a predetermined cycle until the transmission 3 makes a transition to a state other than the forward in-gear state.

First, in S1 (S: a process step), it is determined whether a command requesting a switch to the P range has been output by operating the P switch 511 or a command requesting a switch to the N range has been output by operating the N switch 512. If the determination in S1 is YES, that is, it is determined that a command requesting the switch to the P range or N range has been output, the process proceeds to S2, and control signal is outputted to the transmission actuator 35 to start to put the transmission 3 into the off-gear state. Then, in S3, the slip ratio $\alpha$ of the torque converter 2 is calculated on the basis of signals from the rotational speed sensors 52 and 53.

Then, in S4, it is determined whether the slip ratio $\alpha$ has become equal to or greater than the first predetermined value $\alpha 1$, that is, an engagement-off determination has been made. If the determination in S4 is YES, the process proceeds to S5; if the determination is NO, S5 is skipped, ending the process. In S5, an engagement-off signal is outputted, ending the process.

If the determination in S1 is NO, the process proceeds to S6, and it is determined whether a command requesting a switch to the R range has been output by operating the R switch 514. If the determination in S6 is NO, the process proceeds to S7, and an engagement-on signal is outputted, ending the process. On the other hand, if the determination in S6 is YES, the process proceeds to S8, and control signal is outputted to the transmission actuator 35 to start to put the transmission 3 into the reverse in-gear state, i.e., switch the shift range to the R range. More specifically, in S8, first, the transmission 3 put in the forward in-gear state is put into the off-gear state; when the slip ratio $\alpha$ becomes the first predetermined value $\alpha 1$, an engagement-off determination is made; when a predetermined time elapses after the slip ratio $\alpha$ has become equal to or greater than the first predetermined value $\alpha 1$, the transmission 3 put in the off-gear state is put into the reverse in-gear state; and when the slip ratio $\alpha$ becomes equal to or smaller than the second predetermined value $\alpha 2$, an engagement-on determination is made. Then, the process proceeds to S7. As seen above, even if an engagement-off determination is temporarily made in S8, an engagement-off signal is not outputted.

When the P switch 511 or N switch 512 is operated in a state in which the transmission 3 has made a transition to the reverse in-gear state by operating the R switch 514, a process (not shown) similar to FIG. 4 is performed. Further, when the D switch 513 is operated in a state in which the transmission 3 has made a transition to the reverse in-gear state by operating the R switch 514, it is determined whether a command requesting a switch to the D range has been output, instead of whether the command requesting the switch to the R range has been output in S6 of FIG. 4. Also, the shift range is switched to the D range through the off-gear state for a predetermined time, instead of switching the shift range to the R range through the off-gear state for a predetermined time in S8 of FIG. 4.

Figure 5:
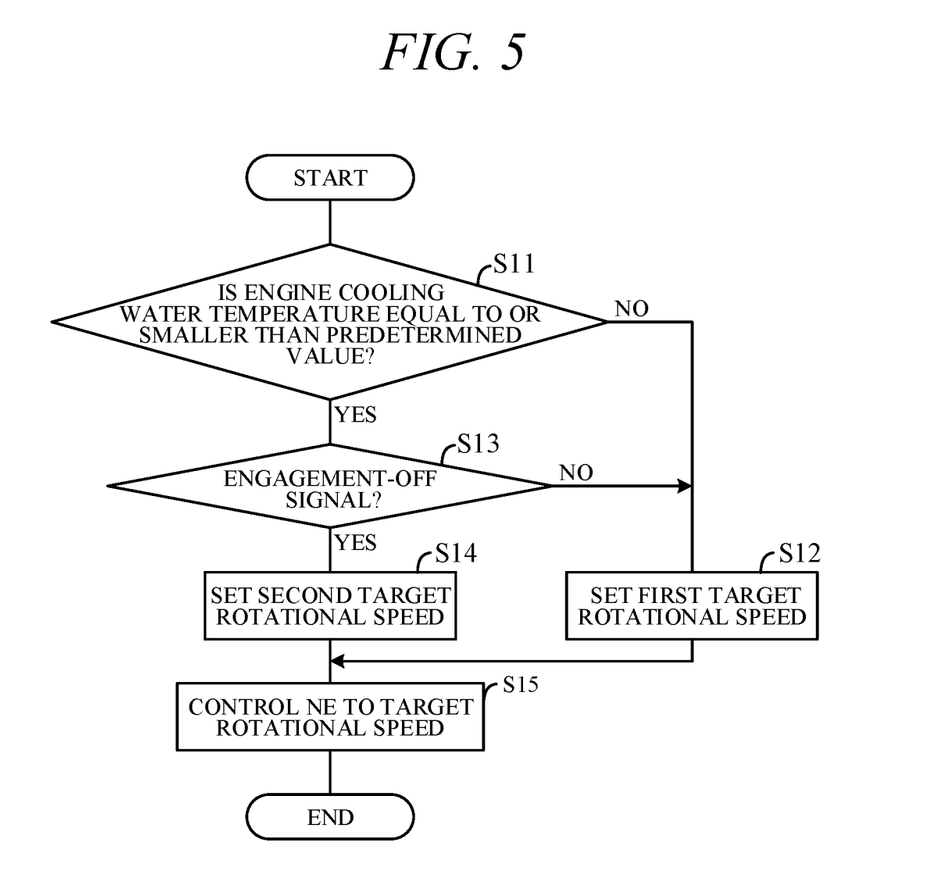
FIG. 5 is a flowchart showing an example of a process performed by of an engine ECU in FIG. 2.

FIG. 5 is a flowchart showing an example of a process performed by the CPU of the engine ECU 42 in FIG. 2 in accordance with a previously stored program. For example, the process shown in this flowchart is started after the engine key switch is turned on and then repeated in a predetermined cycle.

First, in S11, it is determined whether the engine cooling water temperature Tw detected by the water temperature sensor 57 is equal to or lower than the predetermined value Tw1. If the determination in S11 is NO, the process proceeds to S12, and the first target rotational speed Ne1 is set as the target rotational speed (e.g., the target idle rotational speed) of the engine 1.

On the other hand, if the determination in S11 is YES, the process proceeds to S13, and it is determined whether the engagement-off signal is outputting from the transmission ECU 41 (engagement determination portion 412). If the determination in S13 is YES, the process proceeds to S14; if the determination is NO, the process proceeds to S12. In S14, the second target rotational speed Ne2 greater than the first target rotational speed Ne1 by the predetermined rotational speed $\Delta Ne$ is set as the target rotational speed of the engine 1. When the target rotational speed is set in S12 or S14, the process proceeds to S15, and control signal is outputted to the intake actuator 12 to control the engine rotational speed Ne to the target rotational speed Ne1 or Ne2 set in S12 or S14.

Figure 6:
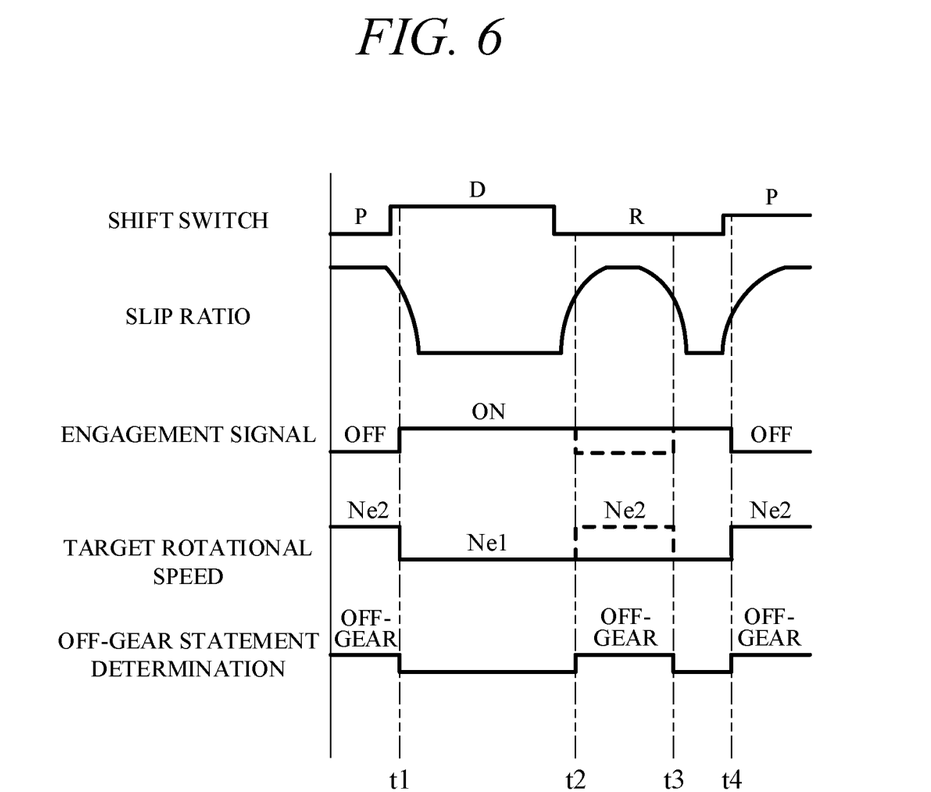
FIG. 6 is a time chart showing an example of the operation of the vehicle control apparatus according to the embodiment of the present invention.

FIG. 6 is a time chart showing an example of the operation of the vehicle control apparatus 100 according to the present embodiment. FIG. 6 shows temporal changes over time of the operation of the shift switch 51, the slip ratio α of the torque converter 2, the type of an engagement signal outputted from the engagement determination portion 412, the target rotational speed set by the target speed setting portion 422, and the off-gear state determination made by the off-gear determination portion 421. The engine cooling water temperature Tw is equal to or lower than the predetermined value Tw1 throughout the time chart of FIG. 6.

As shown in FIG. 6, the transmission 3 is switched to the P range at an initial time point. At this time, an engagement-off signal is output from the transmission ECU 41, and the target rotational speed becomes the second target rotational speed Ne2, which is the higher target rotational speed, preventing an engine stall (S5, S14). When the D switch 513 is operated in this state, driving of the transmission actuator 35 is started so that a forward shift stage is established. At time point t1, the slip ratio α becomes equal to or smaller than the second predetermined value α2, and an engagement-on signal is output from the engagement determination portion 412. Thus, the transmission 3 is put into the forward in-gear state, and the off-gear determination portion 421 determines that the transmission 3 is not in the off-gear state.

Then, when the R switch 514 is operated with the transmission 3 switched to the D range, driving of the transmission actuator 35 is started so that the transmission 3 is put into the off-gear state. At time point t2, the slip ratio α becomes equal to or greater than the first predetermined value α1, and the off-gear determination portion 421 determines that the transmission 3 is in the off-gear state. This transition to the off-gear state is temporary and therefore the engagement determination portion 412 continues to output the engagement-on signal, as shown by a solid line (S8→S7). Accordingly, the target rotational speed remains the first target rotational speed Ne1, as shown by a solid line (S13→S12).

When a predetermined time elapses after the engagement determination portion 412 has made the engagement-off determination, driving of the transmission actuator 35 is started so that the reverse shift stage is established. Thus, at time point t3, the slip ratio α becomes equal to or smaller than the second predetermined value α2, and the transmission 3 is put into the reverse in-gear state, and the off-gear determination portion 421 determines that the transmission 3 is not in the off-gear state.

Then, when the P switch 511 is operated with the transmission 3 switched to the R range, driving of the transmission actuator 35 is started so that the transmission 3 is put into the off-gear state. At time point t4, the slip ratio α becomes equal to or greater than the first predetermined value α1, and the off-gear determination portion 421 determines that the transmission 3 is in the off-gear state. At this time, the engagement determination portion 412 outputs the engagement-off signal. A dotted line in FIG. 6 shows an example of the operation of a comparative example of the present embodiment. In the comparative example, the engagement-off signal is outputted in response to the off-gear determination from time point t2 until time point t3 and thus the target rotational speed is increased to the second target rotational speed Ne2.

According to the embodiment of the present invention, the following advantageous effects can be obtained:

(1) The vehicle control apparatus 100 is applied to the vehicle 101 that includes the engine 1 and the transmission 3 including the forward gear 31 and reverse gear 32 (FIG. 1). The vehicle control apparatus 100 includes: the engagement elements 33 and transmission actuator 35 that switch the torque transmission state to one of a forward in-gear state (D range) in which the torque outputted from the engine 1 is transmitted to the output shaft 3b through the forward gear 31, the reverse in-gear state (R range) in which the torque outputted from the engine 1 is transmitted to the output shaft 3b through the reverse gear 32, and the off-gear state (P range, N range) in which transmission to the output shaft 3b of the torque outputted from the engine 1 is blocked; the P switch 511 and N switch 512 that output a command requesting a switch from the forward in-gear state or the reverse in-gear state to the off-gear state; the R switch 514 that outputs a command requesting a switch from the forward in-gear state to the reverse in-gear state; the D switch 513 that outputs a command requesting a switch from the reverse in-gear state to the forward in-gear state; the transmission control portion 413 that controls the transmission actuator 35 so that when a command requesting a switch to the off-gear state is output by the P switch 511 or N switch 512, the transmission 3 makes a transition from the forward in-gear state or the reverse in-gear state to the off-gear state, and when a command requesting a switch to the reverse in-gear state in the forward in-gear state or the forward in-gear state in the reverse in-gear state is output by the R switch 514 or D switch 513, the transmission 3 makes a transition from the forward in-gear state or the reverse in-gear state through the off-gear state for a predetermined time to the reverse in-gear state or the forward in-gear state; the engagement determination portion 412 that determines whether the engagement elements 33 of the transmission 3 are engaged (engagement is on or off), on the basis of the slip ratio α of the torque converter 2; the target speed setting portion 422 that sets the target rotational speed (e.g., the target idle rotational speed) of the engine 1 on the basis of the determination made by the engagement determination portion 412; the intake actuator 12 that changes the rotational speed of the engine 1; and the engine control portion 423 that controls the intake actuator 12 so that the rotational speed of the engine 1 becomes the target rotational speed set by the target speed setting portion 422 (FIG. 2). If the command requesting the switch to the off-gear state is output by the P switch 511 or N switch 512 and then an engagement-off determination is made on the basis of the slip ratio α and thus the switch to the off-gear state is detected, the target speed setting portion 422 sets the second target rotational speed Ne2 by increasing the target rotational speed compared to that before the switch to the off-gear state has been detected (S14). On the other hand, even if the command requesting the switch to the reverse in-gear state or forward in-gear state is output by the R switch 514 or D switch 513 and then the engagement-off determination is made on the basis of the slip ratio α and thus the switch to the off-gear state is detected, the target speed setting portion 422 sets the first target rotational speed Ne1 without increasing the target rotational speed (S12).

According to this configuration, when the transmission 3 is temporarily put into the off-gear state in the middle of changing from the D range to the R range or from the R range to the D range, the target rotational speed is maintained at the first target rotational speed Ne1. This allows for suppression of a temporary increase in the engine rotational speed and thus for preventing the driver from feeling strange.

(2) The shift switch 51 includes mutually independent multiple switches, i.e., the P switch 511 and N switch 512 that output a command requesting the switch to the off-gear state, the D switch 513 that outputs a command requesting a switch to a forward in-gear state, and the R switch 514 that outputs a command requesting a switch to the reverse in-gear state (FIG. 2). In such a configuration, a command requesting a switch from the D range to the R range not through the N range or a switch from the R range to the D range not through the N range may be output. Such a command differs from a command output by operating the transmission lever. If the engine rotational speed is temporarily increased in such a configuration, the driver is more likely to feel strange. For this reason, the target rotational speed is maintained at the first target rotational speed Ne1 when switching from the D range to the R range or from the R range to the D range. This is effective in preventing the driver from feeling strange.

(3) The vehicle 101 further includes the torque converter 2 disposed between the engine 1 and transmission 3 (FIG. 1). The engagement determination portion 412 determines whether engagement is on or off, on the basis of the slip ratio α of the torque converter 2 (FIG. 3). This allows for accurate detection of the in-gear state and the off-gear state and thus for favorable speed control of the engine 1. In other words, since there is a correlation between the gear state (in-gear state, off-gear state) of the transmission 3 and the slip ratio α of the torque converter 2, favorable speed control corresponding to the gear state of the transmission 3 can be performed by controlling the engine rotational speed on the basis of the slip ratio α.

(4) The vehicle control apparatus 100 further includes the transmission ECU 41 including the transmission control portion 413 and the engine ECU 42 including the engine control portion 423 and communicatively connected to the transmission ECU 41 (FIG. 2). Thus, the engine rotational speed can be favorably controlled using transmission-side information.

The above embodiment can be modified into various embodiments, and modifications will be described below. In the above embodiment, even if the transmission 3 is temporarily put into the off-gear state in the middle of changing from the D range to the R range or from the R range to the D range and thus an engagement-off determination is made, the transmission ECU 41 does not output an engagement-off signal but rather maintains the target rotational speed at the first target rotational speed Ne1. That is, the transmission ECU 41 suppresses an increase in the engine rotational speed by outputting a signal (engagement-on signal) different from the actual state (off-gear state) of the transmission 3. Alternatively, the following configuration may be used: while the transmission ECU 41 outputs a signal (engagement-off signal) corresponding to the actual state (off-gear state) of the transmission 3, the engine ECU 42 does not determine that the transmission 3 is in the off-gear state.

In this case, the off-gear determination portion 421 and target speed setting portion 422 are configured, for example, as follows: when the transmission ECU 41 outputs the engagement-off signal, the off-gear determination portion 421 determines whether the P switch 511 and N switch 512 have been operated; if one of the P switch 511 and N switch 512 has been operated, the off-gear determination portion 421 determines that the transmission 3 is the off-gear state; if none of the P switch 511 and N switch 512 has been operated but the engagement-off signal has been outputted, it determines that the transmission 3 is not the off-gear state. If the off-gear determination portion 421 determines that the transmission 3 is in the off-gear state, the target speed setting portion 422 sets the second target rotational speed Ne2 as the target rotational speed; and if the off-gear determination portion 421 determines that the transmission 3 is not in the off-gear state (is the in-gear state), it sets the first target rotational speed.

Figure 7:
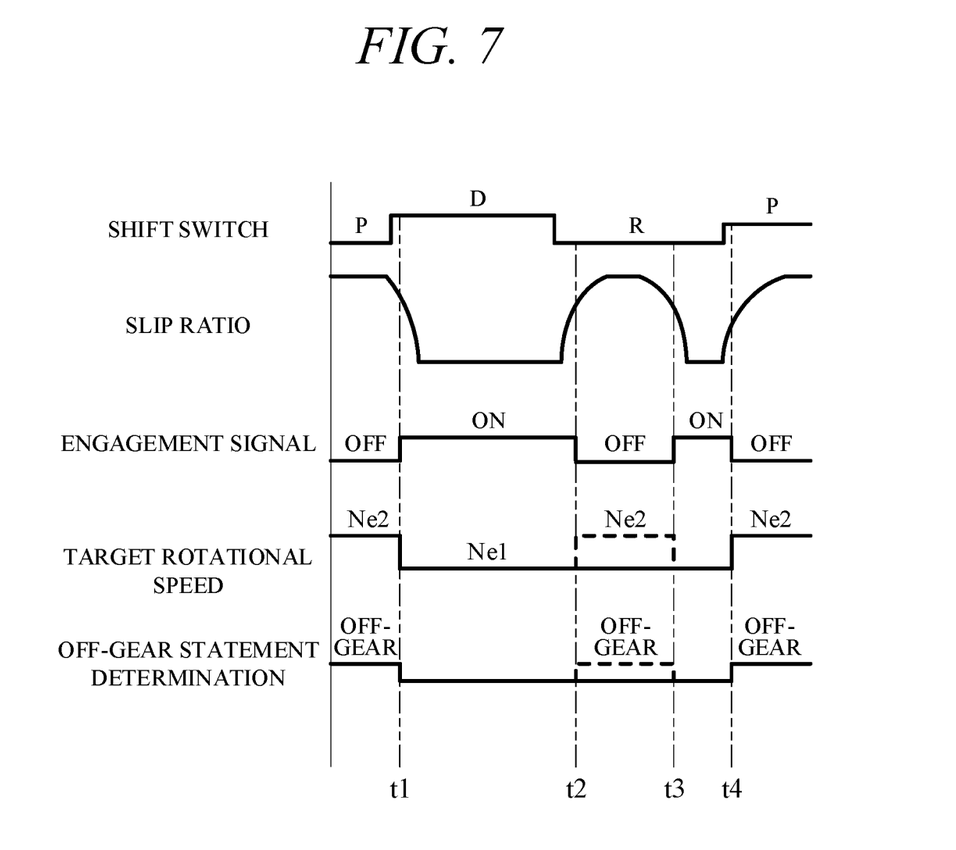
FIG. 7 is a time chart showing another example of the operation of the vehicle control apparatus according to the embodiment of the present invention.

FIG. 7 is a diagram showing an example of a time chart of such a configuration. FIG. 7 differs from FIG. 6 in the operation in a range from time point t2 to time point t3. As shown in FIG. 7, when the R switch 514 is operated with the shift range switched to the D range at time point t2, the transmission 3 is put into the off-gear state and thus the transmission ECU 41 outputs the engagement-off signal. However, as shown by a solid line in FIG. 7, the off-gear determination portion 421 determines that the transmission 3 is not the off-gear state. As a result, the target rotational speed remains the first target rotational speed Ne1, allowing for suppression of a temporary increase in the engine rotational speed.

While, in the above embodiment, one condition for setting the target rotational speed of the engine 1 to the second target rotational speed Ne2 is that the engine cooling water temperature Tw detected by the water temperature sensor 57 as a temperature sensor is equal to or lower than the predetermined value Tw1, this condition need not be used. While, in the above embodiment, the torque transmission state is switched among a forward in-gear state, the reverse in-gear state, and the off-gear state by driving the transmission actuator 35 and thus engaging/disengaging the engagement elements 33 in the transmission 3, a torque transmission switching part is not limited to this configuration. For example, a clutch may be disposed between the engine 1 and transmission 3 so that the torque transmission state is changed by engaging/disengaging the clutch.

While, in the above embodiment, the P switch 511 or N switch 512 serving as a first switch member outputs an instruction to switch from the forward in-gear state or the reverse in-gear state to the off-gear state, a first switch instruction part is not limited to this configuration. While, in the above embodiment, the D switch 513 serving as a second switch member outputs an instruction to switch from the reverse in-gear state to the forward in-gear state, and the R switch 514 serving as a third switch member outputs an instruction to switch from the forward in-gear state to the reverse in-gear state, a second switch instruction part is not limited to this configuration. For example, an instruction to switch from the D range to the R range through the N range or an instruction to switch from the R range to the D range through the N range may be output by operating a lever member.

While, in the above embodiment, the slip ratio α of the torque converter 2 is calculated on the basis of signals from the rotational speed sensor 52 serving as a first speed sensor and the rotational speed sensor 53 serving as a second speed sensor and the engagement determination portion 412 serving as a determination portion determines whether engagement is on or off, on the basis of the slip ratio α and thus it is detected which of the forward in-gear state, the reverse in-gear state, and the off-gear state the torque transmission state is, a torque transmission detecting part is not limited to this configuration. For example, the torque transmission state may be detected on the basis of a signal from a sensor that detects the operation of the engagement elements 33 in the transmission 3. While, in the above embodiment, the engine rotational speed is changed by driving the intake actuator 12, a rotational speed changing part is not limited to this configuration. While, in the above embodiment, the transmission ECU 41 serving as a transmission control unit and the engine ECU 42 serving as an internal combustion engine control unit are communicatively connected through the CAN communication line 43, a vehicle control apparatus is not to the above configuration.

The invention can be also configured as a vehicle control method controlling a vehicle including an internal combustion engine, a transmission having a forward gear and a reverse gear, a torque transmission switching part switching a torque transmission state to one of a forward in-gear state, a reverse in-gear state and an off-gear state, and a rotational speed changing part changing a rotational speed of the internal combustion engine.

The above embodiment can be combined as desired with one or more of the above modifications. The modifications can also be combined with one another.

According to the present invention, it is possible to suppress an increase of an rotational speed of an internal combustion engine when switching from a forward in-gear state to a reverse in-gear state or switching from the reverse in-gear state to the forward in-gear state, and thus it is possible to prevent the driver from feeling strange.

Above, while the present invention has been described with reference to the preferred embodiments thereof, it will be understood, by those skilled in the art, that various changes and modifications may be made thereto without departing from the scope of the appended claims.

What is claimed is:

1. An apparatus configured to control a vehicle including an internal combustion engine and a transmission having a forward gear and a reverse gear, comprising:
   a torque transmission switching part configured to switch a torque transmission state to one of a forward in-gear state in which a torque output from the internal combustion engine is transmitted to an output shaft of the transmission through the forward gear, a reverse in-gear state in which the torque output from the internal combustion engine is transmitted to the output shaft of the transmission through the reverse gear, and an off-gear state in which the torque output from the internal combustion engine is not transmitted to the output shaft of the transmission;
   a first switch instruction part configured to output a first switch instruction to switch from the forward in-gear state or the reverse in-gear state to the off-gear state;
   a second switch instruction part configured to output a second switch instruction to switch from the forward in-gear state to the reverse in-gear state or from the reverse in-gear state to the forward in-gear state;
   a torque transmission detecting part configured to detect the torque transmission state switched by the torque transmission switching part;
   a rotational speed changing part configured to change a rotational speed of the internal combustion engine; and
   an electronic control unit having a microprocessor and a memory connected to the microprocessor, wherein
   the microprocessor is configured to perform:
      controlling the torque transmission switching part so as to switch from the forward in-gear state or the reverse in-gear state to the off-gear state when the first switch instruction is output from the first switch instruction part, and so as to switch from the forward in-gear state or the reverse in-gear state to the off-gear state until a predetermined time has elapsed when the second switch instruction is output from the second switch instruction part and to switch from the off-gear state to the reverse in-gear state or the forward in-gear state after the predetermined time has elapsed;
      setting a target speed of the internal combustion engine in accordance with the torque transmission state detected by the torque transmission detecting part; and
      controlling the rotational speed changing part so that the rotational speed of the internal combustion engine becomes the target speed set in the setting, and wherein the microprocessor is configured to perform
      the setting including increasing the target speed when the off-gear state is detected by the torque transmission detecting part after the first switch instruction is output by the first switch instruction part, while not increasing the target speed even when the off-gear state is detected by the torque transmission detecting part after the second switch instruction is output by the second switch instruction part.

2. The apparatus according to claim 1, wherein
the first switch instruction part includes a first switch member configured to instruct to switch to the off-gear state, and
the second switch instruction part includes a second switch member configured to instruct to switch to the forward in-gear state and a third switch member configured to instruct to switch to the reverse in-gear state.

3. The apparatus according to claim 1, wherein
the vehicle further includes a torque converter between the internal combustion engine and the transmission, and
the torque transmission detecting part is configured to detect the torque transmission state, based on a slip ratio indicating a slip state of the torque converter.

4. The apparatus according to claim 3, wherein
the torque transmission detecting part includes a first speed sensor configured to detect a rotational speed of an output shaft of the internal combustion engine and a second speed sensor configured to detect a rotational speed of an input shaft of the transmission, and
the microprocessor is configured to further perform
   calculating the slip ratio by dividing the rotational speed detected by the second speed sensor by the rotational speed detected by the first speed sensor,
   determining whether a switch from the off-gear state to the in-gear state has completed and whether a switch from the in-gear state to the off-gear state has completed, based on the slip ratio calculated in the calculating, and wherein
the microprocessor is configured to perform
   the determining including determining that the switch to the off-gear state has completed when the slip ratio in the in-gear state is greater than or equal to a first predetermined value, and determining that the switch to the in-gear state has completed when the slip ratio in the off-gear state is smaller than or equal to a second predetermined value.

5. The apparatus according to claim 1, further comprising:
a transmission control unit including a microprocessor performing controlling the torque transmission switching part; and
an internal combustion engine control unit including a microprocessor performing controlling the internal combustion engine and communicatively connected to the transmission control unit.

6. The apparatus according to claim 1, further comprising:
a temperature sensor configured to detect a cooling water for the internal combustion engine, wherein
the microprocessor is configured to perform
the setting including increasing the target speed when the off-gear state is detected by the torque transmission detecting part after the first switch instruction is output by the first switch instruction part in a state where the cooling water detected by the temperature sensor is lower than or equal to a predetermined value, while not increasing the target speed even when the off-gear state is detected by the torque transmission detecting part after the first switch instruction is output by the first switch instruction part in a state where the cooling water detected by the temperature sensor is higher than the predetermined value.

7. An apparatus configured to control a vehicle including an internal combustion engine and a transmission having a forward gear and a reverse gear, comprising:
a torque transmission switching part configured to switch a torque transmission state to one of a forward in-gear state in which a torque output from the internal combustion engine is transmitted to an output shaft of the transmission through the forward gear, a reverse in-gear state in which the torque output from the internal combustion engine is transmitted to the output shaft of the transmission through the reverse gear, and an off-gear state in which the torque output from the internal combustion engine is not transmitted to the output shaft of the transmission;
a first switch instruction part configured to output a first switch instruction to switch from the forward in-gear state or the reverse in-gear state to the off-gear state;
a second switch instruction part configured to output a second switch instruction to switch from the forward in-gear state to the reverse in-gear state or from the reverse in-gear state to the forward in-gear state;
a torque transmission detecting part configured to detect the torque transmission state switched by the torque transmission switching part;
a rotational speed changing part configured to change a rotational speed of the internal combustion engine; and
an electronic control unit having a microprocessor and a memory connected to the microprocessor, wherein
the microprocessor is configured to function as:
a transmission control portion configured to control the torque transmission switching part so as to switch from the forward in-gear state or the reverse in-gear state to the off-gear state when the first switch instruction is output from the first switch instruction part, and so as to switch from the forward in-gear state or the reverse in-gear state to the off-gear state until a predetermined time has elapsed when the second switch instruction is output from the second switch instruction part and to switch from the off-gear state to the reverse in-gear state or the forward in-gear state after the predetermined time has elapsed;
a target speed setting portion configured to set a target speed of the internal combustion engine in accordance with the torque transmission state detected by the torque transmission detecting part; and
an internal combustion engine control portion configured to control the rotational speed changing part so that the rotational speed of the internal combustion engine becomes the target speed set by the target speed setting portion, wherein
the target speed setting portion is configured to increase the target speed when the off-gear state is detected by the torque transmission detecting part after the first switch instruction is output by the first switch instruction part, while not to increase the target speed even when the off-gear state is detected by the torque transmission detecting part after the second switch instruction is output by the second switch instruction part.

8. The apparatus according to claim 7, wherein
the first switch instruction part includes a first switch member configured to instruct to switch to the off-gear state, and
the second switch instruction part includes a second switch member configured to instruct to switch to the forward in-gear state and a third switch member configured to instruct to switch to the reverse in-gear state.

9. The apparatus according to claim 7, wherein
the vehicle further includes a torque converter between the internal combustion engine and the transmission, and
the torque transmission detecting part is configured to detect the torque transmission state based on a slip ratio indicating a slip state of the torque converter.

10. The apparatus according to claim 9, wherein
the forward in-gear state and the reverse in-gear state are included in an in-gear state,
the torque transmission detecting part includes a first speed sensor configured to detect a rotational speed of an output shaft of the internal combustion engine and a second speed sensor configured to detect a rotational speed of an input shaft of the transmission, and
the microprocessor is configured to further function as:
a slip ratio calculation portion configured to calculate the slip ratio by dividing the rotational speed detected by the second speed sensor by the rotational speed detected by the first speed sensor; and
a determination portion configured to determine whether a switch from the off-gear state to the in-gear state has completed and whether a switch from the in-gear state to the off-gear state has completed, based on the slip ratio calculated by the slip ratio calculation portion, and wherein
the determination portion is configured to determine that the switch to the off-gear state has completed when the slip ratio in the in-gear state is greater than or equal to a first predetermined value, and determine that the switch to the in-gear state has completed when the slip ratio in the off-gear state is smaller than or equal to a second predetermined value.

11. The apparatus according to claim 7, further comprising:
a transmission control unit including the transmission control portion; and
an internal combustion engine control unit including the internal combustion engine control portion and communicatively connected to the transmission control unit.

12. The apparatus according to claim 7, further comprising:
a temperature sensor configured to detect a cooling water for the internal combustion engine, wherein
the target speed setting portion is configured to increase the target speed when the off-gear state is detected by the torque transmission detecting part after the first switch instruction is output by the first switch instruction part in a state where the cooling water detected by the temperature sensor is lower than or equal to a predetermined value, while not to increase the target speed even when the off-gear state is detected by the torque transmission detecting part after the first switch instruction is output by the first switch instruction part in a state where the cooling water detected by the temperature sensor is higher than the predetermined value.

* * * * *